United States Patent
Agusta

(10) Patent No.: US 6,584,192 B1
(45) Date of Patent: Jun. 24, 2003

(54) METHOD AND APPARATUS FOR SKILLS-BASED TASK ROUTING

(75) Inventor: Joseph B. Agusta, Chapel Hill, NC (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

(21) Appl. No.: 09/455,088

(22) Filed: Dec. 6, 1999

(51) Int. Cl.$^7$ ................................................. H04M 3/00
(52) U.S. Cl. .............................. 379/265.12; 379/265.06
(58) Field of Search ......................... 379/265.06, 265.1, 379/265.11, 265.12

(56) References Cited

U.S. PATENT DOCUMENTS

| | | | | |
|---|---|---|---|---|
| 5,206,903 A | * | 4/1993 | Kohler et al. | 379/214.01 |
| 6,163,607 A | * | 12/2000 | Bogart et al. | 379/265.02 |
| 6,173,053 B1 | * | 1/2001 | Bogart et al. | 379/265.02 |

* cited by examiner

Primary Examiner—Ahmad F. Matar
Assistant Examiner—Quynh Nguyen
(74) Attorney, Agent, or Firm—Donald R. Boys; Central Coast Patent Agency, Inc.

(57) ABSTRACT

An efficient algorithm is presented for selecting an agent to service a task in a skills-based routing system. A set X is determined of all states of the boolean variables that contain the required skills for a task. A resume table of available agents is built, organized by the states of the N variables; each agent is represented in each state that includes all skills possessed by the agent. All available and qualified agents are determined from the resume table; those agents associated with a state of the resume table outside of the set X are disqualified. An agent is selected from those remaining. Preferably, an agent is selected having a minimum qualification level to service the task. One preferred way of doing this is to subtract from the number of terms in a canonical form of the required skills expression a number equal to the number of times the agent appears in the set of states X and picking an agent with the lowest result. In the preferred embodiment, however, proficiency levels of each required skill are taken into account in making the final selection.

20 Claims, 4 Drawing Sheets

FIG. 1 - AGENT RESUME TABLE

| A | 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|---|
| B | 0 | 0 | 0 | 0 | 1 | 1 | 1 | 1 | 0 | 0 | 0 | 0 | 1 | 1 | 1 | 1 |
| C | 0 | 0 | 1 | 1 | 0 | 0 | 1 | 1 | 0 | 0 | 1 | 1 | 0 | 0 | 1 | 1 |
| D | 0 | 1 | 0 | 1 | 0 | 1 | 0 | 1 | 0 | 1 | 0 | 1 | 0 | 1 | 0 | 1 |
|   |   | A1 | A2 | A1 A2 | A3 | A1 A3 | A2 A3 A6 | A1 A2 A3 A6 | A4 X | A1 A4 | A2 A4 | A1 A2 A4 | A3 A4 A5 | A1 A3 A4 A5 A8 | A2 A3 A4 A5 A6 A7 | A1 A2 A3 A4 A5 A6 A7 A8 A9 |

FIG. 2

| A | 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|---|
| B | 0 | 0 | 0 | 0 | 1 | 1 | 1 | 1 | 0 | 0 | 0 | 0 | 1 | 1 | 1 | 1 |
| C | 0 | 0 | 1 | 1 | 0 | 0 | 1 | 1 | 0 | 0 | 1 | 1 | 0 | 0 | 1 | 1 |
| D | 0 | 1 | 0 | 1 | 0 | 1 | 0 | 1 | 0 | 1 | 0 | 1 | 0 | 1 | 0 | 1 |
|   |   |   |   |   |   |   |   |   |   |   |   |   |   | X | X | X |

FIG. 3

| A | 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|---|
| B | 0 | 0 | 0 | 0 | 1 | 1 | 1 | 1 | 0 | 0 | 0 | 0 | 1 | 1 | 1 | 1 |
| C | 0 | 0 | 1 | 1 | 0 | 0 | 1 | 1 | 0 | 0 | 1 | 1 | 0 | 0 | 1 | 1 |
| D | 0 | 1 | 0 | 1 | 0 | 1 | 0 | 1 | 0 | 1 | 0 | 1 | 0 | 1 | 0 | 1 |
|   |   |   |   |   |   |   |   |   |   |   |   |   |   | X A8 | X A7 | X A7 A8 A9 |

FIG. 4 - AGENT PROFICIENCIES

|   | A1 | A2 | A3 | A4 | A5 | A6 | A7 | A8 | A9 |
|---|----|----|----|----|----|----|----|----|----|
| A | 0 | 0 | 0 | 5 | 5 | 0 | 9 | 9 | 7 |
| B | 0 | 0 | 6 | 0 | 5 | 7 | 9 | 5 | 7 |
| C | 0 | 8 | 0 | 0 | 0 | 6 | 5 | 9 | 8 |
| D | 5 | 0 | 0 | 0 | 0 | 0 | 9 | 9 | 9 |

METHOD AND APPARATUS FOR SKILLS-BASED TASK ROUTING

TECHNICAL FIELD

The invention relates to the field of service center operation. Specifically, it relates to efficiently selecting agents for servicing incoming tasks or outgoing tasks based on sets of skills required to service the individual tasks. The invention further relates to selecting agents having adequate, but minimal, skills to service these tasks.

BACKGROUND OF THE INVENTION

There are many known algorithms which have been used to route tasks, such as incoming calls, to agents within a group or groups in call and service centers. Recently, operators have realized the importance of task routing based on the skills of agents as compared to the needs required to adequately service individual tasks. For instance, a telephone caller may require expertise in a particular software or hardware system, or expertise in a particular sector of the financial market, or a specific company. The same is true of a person requesting assistance by e-mail. Further, a caller may speak only a specific language and therefore require an agent fluent in that language. The list of possible skills goes on and on, and are defined by the owners of the individual service centers according to the purposes of the service centers.

U.S. Pat. No. 5,825,869, issued to Brooks et. al. On Oct. 20, 1998, describes a system for skill-based routing of telephone calls. Brooks attempts to select agents whose proficiency in specified skills are closest to the required proficiency levels of one or more required skills. However, Brooks describes no algorithm for actually performing the calculations and logic to make the selection. Therefore, it must be presumed that Brooks performs a brute-force method in which all available agents are evaluated in a straight-forward manner and then the results compared to finally select an agent. Prior versions of IBM's CallPath products performed a similar brute-force manner of agent selection. However, such methods of agent selection are very inefficient, especially for service centers that experience high levels of traffic.

SUMMARY OF THE INVENTION

The invention assigns tasks to agents in a service center based on agent skills required to service individual tasks. In response to a task to be serviced, the agent skills required to process the task are ascertained out of a set of N defined skills. It is convenient to consider the N skills as represented by N separate boolean variables. A set X is determined containing all logical states of the boolean variables that contain the required skills. Then a resume table of available agents is built. It is convenient to view the resume table as organized by the logical states of the N boolean variables; each agent is represented in each state that includes all skills possessed by the agent. All available agents qualified to service the task are determined from the resume table of available agents. From this set of agents, those agents associated with a state of the agent resume table that is not within the set X are disqualified for serving the task. After this, an agent is selected from those remaining to service the task.

Preferably, an agent is selected that has the minimum qualification level to service the task from among those agents remaining in contention. One preferred way of doing this is to subtract from the number of terms in a canonical form of the required skills expression a number equal to the number of times the agent appears in the set of states X and picking an agent with the lowest result. In the preferred embodiment, however, proficiency levels of each required skill are taken into account in selecting an agent. In the preferred embodiment, a number AP equal to the number of times the agent appears in the set of states X is computed for each agent remaining in contention. These agents are grouped according to their values of AP. The groups are then processed in the order of lowest value of AP to greatest value of AP until an agent is selected. For each group processed, a proficiency table is searched containing proficiency levels for all skills possessed by the agents remaining in contention. Agents in the present group that do not possess the minimum proficiency level for each skill in the skills expression are eliminated from contention. A normalized proficiency level is then calculated for all remaining agents in the present group. If there are any agents left in the present group at this time, the agent with the smallest normalized proficiency level is selected to service the task. Otherwise, the next group is processed. If no qualified agent is found after processing all groups, the task is re-queued for later service.

BRIEF DESCRIPTION OF THE DRAWING

In the drawing,

FIG. 1 shows an illustrative agent resume table. For a set of skills A, B, C, D, this table lists each agent that possesses each skill;

FIG. 2 shows a subset of all combinations of the skills A, B, C, D that satisfy the skills required to service an illustrative incoming task, such as a telephone call;

FIG. 3 shows all agents that are qualified to service the illustrative task according to the invention;

FIG. 4 is an illustrative table of agent proficiencies for each of the skills A, B, C, D;

DETAILED DESCRIPTION

Figure 5:
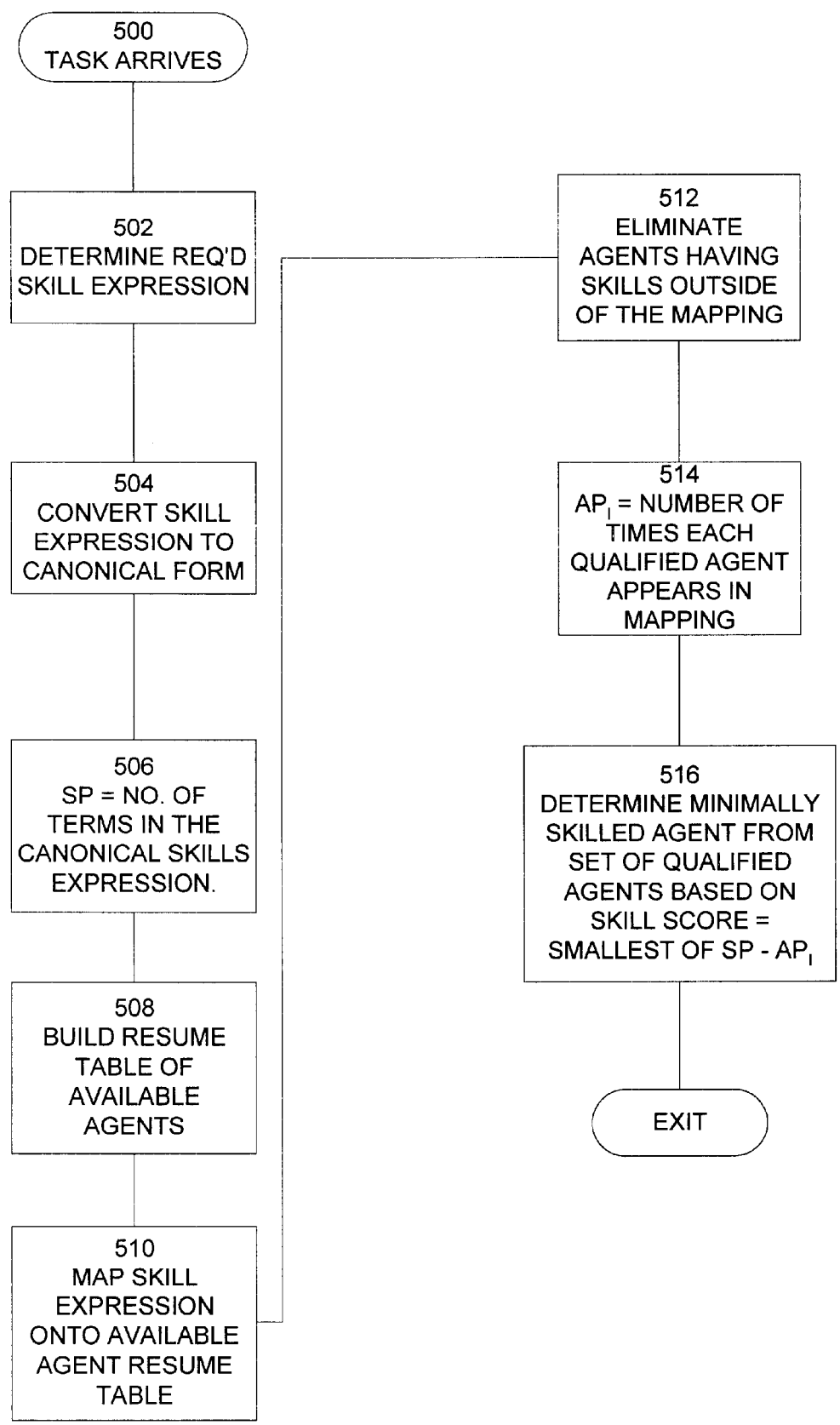
FIG. 5 is an illustrative flowchart of steps for selecting an agent for the illustrative incoming task without consideration of skill proficiencies.

FIG. 1 shows an illustrative agent resume table of skills for an illustrative task center. The task center might receive telephone calls, e-mail, World-Wide-Web (WWW) based inquiries or other types of tasks, including tasks not yet defined. For this example, it is assumed that four skills A, B, C and D are defined for the servicing of tasks. The skills required to service any given task might be obtained from a database accessed by a user identification, or obtained by prompting a caller with questions and collecting answers dialed from a telephone, or perhaps from a WWW form filled in by a user. The table of FIG. 1 lists each agent that possesses each skill. Nine agents identified as A1 through A9 are assumed. For this example the following agent/skill mapping is assumed:

| AGENT | SKILLS |
|---|---|
| A1 | D |
| A2 | C |
| A3 | B |
| A4 | A |
| A5 | A, B, D |
| A6 | B, C, D |
| A7 | A, B, C |
| A8 | A, B, D |
| A9 | A, B, C, D |

According to the invention, in the resume table of FIG. 1, each agent is listed in each combinatorial state of the boolean variables ABCD that contains all of the skills possessed by the agent. Thus, for example, agent A1 possesses only skill D. Therefore, agent A1 appears in every combinatorial state of ABCD that requires skill D. Agent A7 has skills A, B and C. Therefore, A7 appears in each state that requires these three skills. There are only two such states: ABCD=1110 and ABCD=1111.

For the first embodiment, it is assumed that proficiency levels of skills are not considered. That is, an agent either possesses a skill or not. Assume that a task arrives and it is determined that skill sets defined by the boolean expression A*B*(C+D) are required to service the task, where * is the logical AND operator and + is the logical OR operator. If necessary, the required skill expression is converted to canonical form. In this example, the canonical form of A*B*(C+D) is A*B*C+A*B*D. The canonical expression is now mapped onto the combinatorial states of ABCD. The ABCD states that satisfy the canonical expression are 1110, 1101, and 1111. This mapping is shown in FIG. 2. Those states marked with an "X" in FIG. 2 are the states that satisfy the skills expression. Agents that have skills outside of this mapping in the resume table are immediately determined to be unqualified to service the illustrative task. Thus, from FIGS. 2 and 1, it is immediately seen that agents A1, A2, A3, A4, A5 and A6 are eliminated, leaving only agents A7, A8 and A9 as qualified to service the task. Now, in accordance with the invention, from the set of qualified agents, it is wished to select that agent that is minimally qualified to service the task. In this first embodiment in which proficiency levels are not considered, this is accomplished by counting the number of terms that appear in the canonical expression of required skills (call this value SP for skill points) and also determining the number of times each qualified agent appears in the mapping of FIG. 3 (call these values $AP_I$, where I identifies each qualified agent). Now the minimally qualified agent is selected by selecting the agent with the lowest score of $SP-AP_I$. In the present example, the canonical expression contains three terms, 1110, 1101, and 1111. Therefore, SP=3. For the qualified agents A7, A8 and A9, it is determined from FIG. 3 that $AP_7$=2 (A7 appears in both 1110 and 1111)

$AP_8$=2 (A8 appears in both 1101 and 1111)

$AP_9$=1 (A9 appears only in 1111)

The smallest value of $SP-AP_I$ for this example is 3−2=1 and is a tie for both agents A7 and A8. In a situation such as this, the selection of A7 or A8 to service the task can be arbitrary or other criteria might be considered to choose between A7 and A8. For example, the time since the last task serviced might be maintained for each agent and the agent selected having the largest value. Other criteria might be used as well, such as total call handling minutes, or total number of tasks handled.

The flowchart of steps for the above example is shown in FIG. 5. At entry point 500, it is assumed that a task arrives for servicing. Step 502 determines in any number of suitable ways the skills expression required to service the task. Step 504 converts the required skills expression to canonical form, if necessary. Step 506 assigns to the variable SP the number of terms in the canonical form of the required skills expression. Step 508 builds the agent resume table of FIG. 1, considering only those agents that are presently available for servicing a task. Step 510 maps the required skills expression onto the available agent resume table to generate the mapping of FIG. 2. Step 512 eliminates all agents that have skills outside of the mapping of FIG. 2. This generates the mapping of qualified agents (FIG. 3) for the task at hand. Step 514 calculates the value of $AP_I$ for each qualified agent, where it is recalled that $AP_I$ for agent I is the number of times that agent appears in the mapping of FIG. 3. Finally, step 516 selects the minimally qualified available agent by selecting the agent with the smallest value of $SP-AP_I$. This algorithm for selecting a qualified agent to service a task is very efficient compared to known brute force methods of plowing through the skills of all agents to generate a qualified set and then plowing though that set to find a minimally qualified agent.

Figure 6:
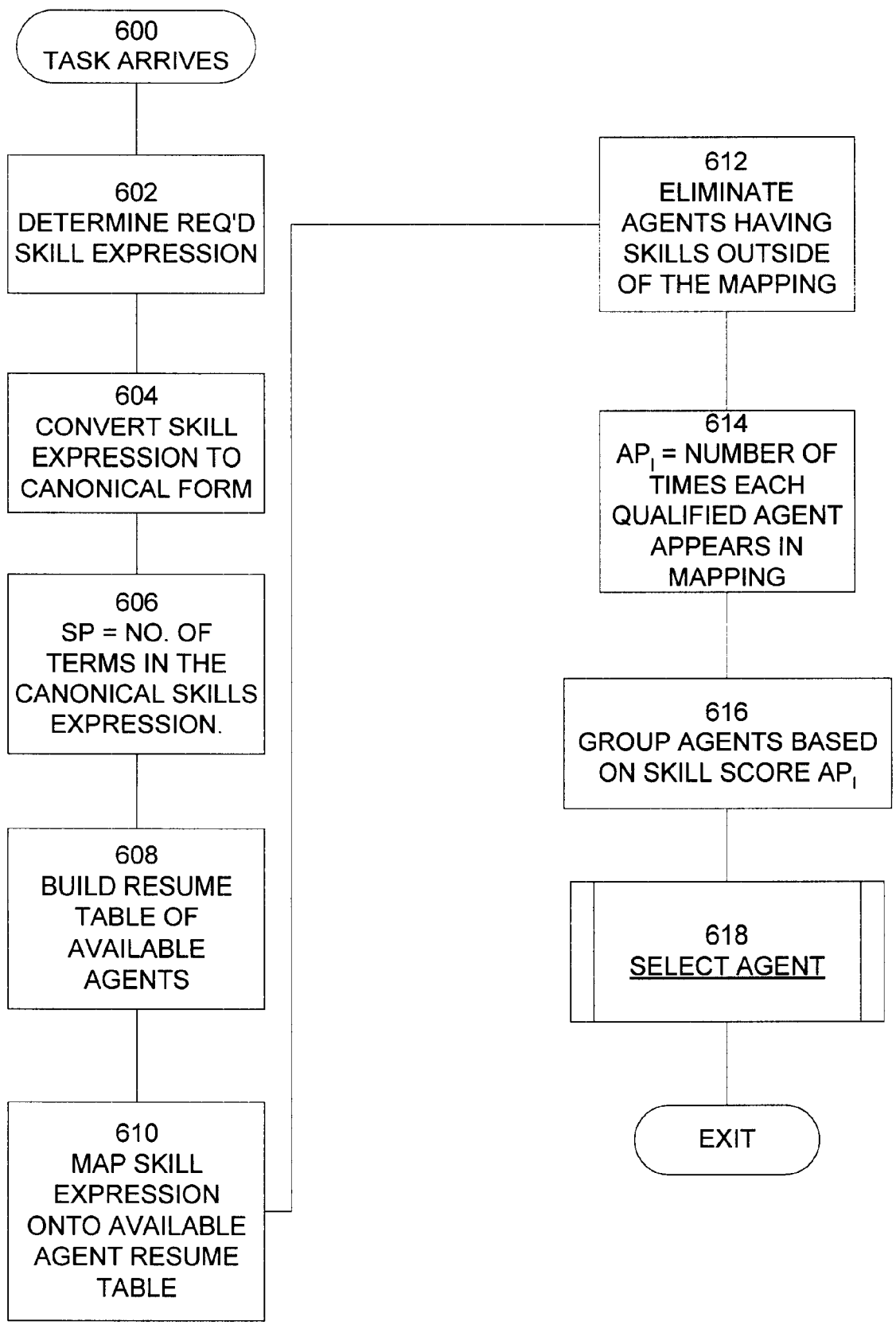
FIGS. 6 and 7 are illustrative flowcharts of steps for selecting an agent for the incoming task with consideration of agent proficiencies.
Figure 7:
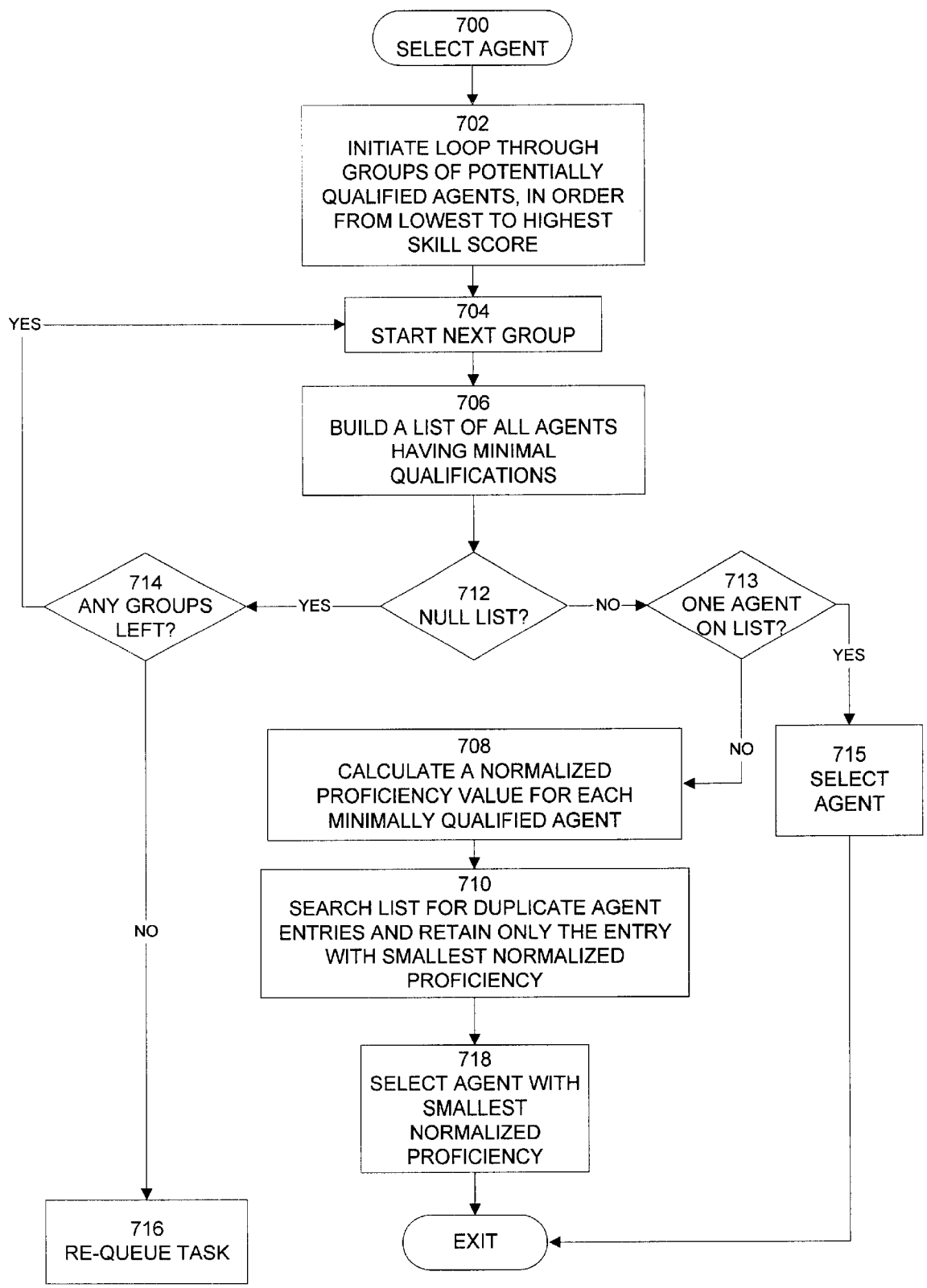

FIGS. 6 and 7 illustrate the preferred embodiment of the invention, in which proficiency levels of skills are taken into account in selecting agents for tasks. For the preferred embodiment, FIG. 4 illustrates a set of assumed proficiency levels of the agents for each of the skills A, B, C, D. By way of example, it is assumed that proficiency levels vary from 0 to 9, where 0 represents no proficiency and 9 represents a complete mastery of a skill. We will use the same required skills example as used for the first embodiment, except for this preferred embodiment it is assumed that the required proficiency levels for A, B, C, and D for the task are 7, 6, 6 and 9, respectively. Thus, the canonical form of the required skills expression is A*B*C+A*B*D, with proficiency levels of A>=7, B>=6, C>=6 and D=9.

The steps of the preferred embodiment in FIG. 6 are exactly the same as. discussed with respect to FIG. 5 up through step 614, which calculates the value of $AP_I$ for each available agent that has at least some proficiency in each of the required skills. Thus, for this example, only agents A7, A8 and A9 are potentially qualified and their respective values of $AP_I$ are 2, 2, 1 as in the first embodiment. Thus, agents A7 and A8 are qualified, but less skilled than A9 (ignoring proficiency levels at this point). Step 616 forms groups of these available agents based on the values of $AP_I$; these groups are then ordered from lowest value to highest value of $SP-AP_I$. Agents A7 and A8 form a first group having an AP of 2; Agent A9 forms a second group having an AP of 1. SP is 3 (the number of skill states in set X). Therefore, SP-AP for the first and second groups is 1 and 2, respectively, and the groups are ordered this way from low to high SP-AP.

Step 618 calls a subroutine SELECT AGENT, shown in FIG. 7, to select a minimally qualified agent from these two ordered groups.

With reference to FIG. 7, step 702 of SELECT AGENT initiates a programmed loop based on the number of groups formed by step 616 (two in this example). This loop progresses through each group in the order of lowest to highest value of $SP-AP_I$ and looks for the first agent with the required proficiency levels in the required skills to service the task. Step 704 starts the first loop. Step 706 builds a list of agents from the first group that meet the minimum proficiency levels of all required skills. Agents A7 and A8 are in the first group. From FIG. 4 it is noted that agent A7 does not meet the required proficiency level of 6 for skill C. From FIG. 4 it is noted that agent A8 does not have the required proficiency of 6 for skill B to service the task. Therefore, there are no qualified agents in the first group and steps 712 and 714 return to step 704 to examine the second group. The second group contains agent A9. From FIG. 4, it is seen that agent A9 has the proficiency levels of 7,7,8,9 for A,B,C,D. Thus, agent A9 meets all of the required proficiencies and is qualified to service the task. Step 712 next determines if there are any entries on the qualified agent list from the present group. Since there is one such entry in this example, step 713 is next executed and determines if there is only one qualified agent on the list. If so, step 715 selects that agent and returns to the calling program in FIG. 6. Such is the case in this example. However, if step 713 determines that there are two or more agents on the qualified list, then step 708 is next executed. Step 708 calculates a normalized proficiency for each agent on the qualified list. In the preferred embodiment, the normalized proficiency is calculated by summing an agent's proficiency levels for each of the skills in a qualifying skill state and subtracting from that value the sum of the proficiencies for the same skills as defined by that state.

As an example of the proficiency normalization process, assume that a call requires only skills A and B, with a proficiency level of 8 for skill A and a proficiency level of 5 for B. In this situation, ABCD skill states of 1100, 1101, 1110, and 1111 apply and form the skill set X. From FIG. 1, on disqualifying agents that appear in skill states outside of X, it is seen that agents A1, A2, A3, A4, A5 and A6 are immediately disqualified, leaving agents A7, A8 and A9 in contention. From FIG. 4, it is seen that agent A9 does not meet the required proficiency of 8 for skill A. This leaves only agents A7 and A8 in contention.

For agent A7, the first qualifying skill state is 1110. From FIG. 4, the sum of A7's proficiencies for the skills A, B are 9+9=18. The sum of the required proficiencies for A and B is 8+5=13. Therefore, the normalized proficiency for A7 is 18−13=5. The second qualifying state for A7 is 1111. A7's normalized proficiency for this state is still 5, because the matching skill states 1110 and 1111 are included in X because of a match on the same skills A and B. The normalized proficiency for duplicate entries would not necessarily be the same if, for example, one term of the canonized skill expression was ABC and a second term was ABD.

For agent A8, the first qualifying skill state is 1101. From FIG. 4, the sum of A8's proficiencies for the skills A, B are 9+5=14. The sum of the required proficiencies for A and B is 8+5=14. Therefore, the normalized proficiency for A7 is 14−14=0. The second qualifying state for A8 is 1111. A8's normalized proficiency for this state is still 0, because the matching skill states 1101 and 1111 are included in X because of a match on the same skills A and B.

At this point, the qualified list contains four entries, two for agent A7 with normalized proficiencies of 5 and 5, and two for agent A8 with normalized proficiencies of 0 and 0. Step 710 searches this list for duplicate entries and retains only the smallest duplicate entry. In this example, step 710 will eliminate either one of the A7 entries and the same is true for the A8 entries. This leaves a list with A7-5 and A8-0, where the number after the hyphen is the normalized proficiency. Step 718 now merely scans the list and selects the least qualified agent to service the task. In this example, this is agent A8 with a proficiency level of 0.

The loop described above continues until an agent is selected or until all groups are exhausted. If no qualified agent is found before all groups are exhausted, step 714 causes the task to be re-queued for service at a later time.

It is understood that the above described arrangements are merely illustrative of the application of principles of the invention and that other arrangements may be devised by workers skilled in the art without departing from the spirit and scope of the invention.

I claim:

1. A method of assigning tasks to agents in a service center based on agent skills required to service individual tasks, comprising;

in response to a task to be serviced, ascertaining all agent skills required to process the task out of a set of N defined skills, representing the N skills as N separate boolean variables, determining a set X of all logical states of the boolean variables that contain the required skills, building a resume table of available agents, wherein the resume table is organized by the logical states of the N boolean variables and each agent is represented in each state that includes all skills possessed by the agent, determining from the resume table of available agents all agents qualified to service the task, disqualifying from serving the task all agents associated with a state of the agent resume table that is not within the set X, selecting an agent to service the task from the agents remaining in contention.

2. The method of claim 1 wherein the selecting step further comprises;

selecting an agent with a minimum qualification level from among the agents remaining in contention.

3. The method of claim 2 wherein the qualification level for an agent is computed by subtracting from the number of terms in a canonical form of the required skills expression a number equal to the number of times the agent appears in the set of states X.

4. The method of claim 1 wherein the selecting step further comprises;

computing for each agent remaining in contention a number AP equal to the number of times the agent appears in the set of states X, grouping the agents remaining in contention according to their values of AP, processing the groups in the order of lowest value of AP to greatest value of AP until an agent is selected, for each group processed, searching a proficiency table containing proficiency levels for all skills possessed by the agents remaining in contention, eliminating from contention agents in the present group that do not possess the minimum proficiency level for each skill in the skills expression, calculating a normalized proficiency level for all remaining agents in the present group, selecting the agent with the smallest normalized proficiency level if there are any agents remaining in contention in the present group, and processing the next group, if any, if there are no remaining agents in the present group.

5. The method of claim 4 wherein the normalized proficiency is calculated by summing an agent's proficiency levels for each of the skills in a qualifying skill state and subtracting from that value the sum of the required proficiencies for the same skills.

6. Apparatus for assigning tasks to agents in a service center based on agent skills required to service individual tasks, comprising;

means responsive to a task to be serviced for ascertaining all agent skills required to process the task out of a set of N defined skills, means for representing the N skills as N separate boolean variables, means for determining a set X of all logical states of the boolean variables that contain the required skills, means for determining from an agent resume table all agents qualified to service the task, wherein the agent resume table is organized by the logical states of the N boolean variables and each agent is represented in each state that includes all skills possessed by the agent, means for disqualifying from serving the task all agents associated with a state of the agent resume table that is not within the set X, means for selecting an agent to service the task from the agents remaining in contention.

7. The apparatus of claim 6 wherein the selecting means further comprises;

means for selecting an agent with a minimum qualification level from among the agents remaining in contention.

8. The apparatus of claim 7 wherein the selecting means further comprises;

means for computing the qualification level for an agent by subtracting from the number of terms in a canonical form of the required skills expression a number equal to the number of times the agent appears in the set of states X.

9. The apparatus of claim 6 wherein the selecting means further comprises;

means for computing for each agent remaining in contention after the disqualifying step a number AP equal to the number of times the agent appears in the set of states X, means for grouping the agents remaining in contention according to their values of AP, means for processing the groups in the order of lowest value of AP to greatest value of AP until an agent is selected, means for searching for each group processed a proficiency table containing proficiency levels for all skills possessed by the agents remaining in contention, means for eliminating from contention agents in the present group that do not possess the minimum proficiency level for each skill in the skills expression, means for calculating a normalized proficiency level for all remaining agents in the present group, means for selecting the agent with the smallest normalized proficiency level if there are any agents remaining in contention in the present group, and means for processing the next group, if any, if there are no remaining agents in the present group.

10. The apparatus of claim 9 wherein the calculating means further comprises;

means for summing an agent's proficiency level for each of the skills in a qualifying skill state and means for subtracting from that value the sum of the required proficiencies for the same skills.

11. Computer program code embodied in a storage medium for controlling a computer to assign tasks to agents in a service center based on agent skills required to service individual tasks, the program code comprising;

a first code segment responsive to a task to be serviced for ascertaining all agent skills required to process the task out of a set of N defined skills, a second code segment for representing the N skills as N separate boolean variables, a third code segment for determining a set X of all logical states of the boolean variables that contain the required skills, a fourth code segment for determining from an agent resume table all agents qualified to service the task, wherein the agent resume table is organized by the logical states of the N boolean variables and each agent is represented in each state that includes all skills possessed by the agent, a fifth code segment for disqualifying from serving the task all agents associated with a state of the agent resume table that is not within the set X, a sixth code segment for selecting an agent to service the task from the agents remaining in contention.

12. The program code of claim 11 wherein the sixth code segment further comprises;

a seventh code segment for selecting an agent with a minimum qualification level from among the agents remaining in contention.

13. The program code of claim 12 wherein the seventh code segment further comprises an eighth code segment for subtracting from the number of terms in a canonical form of the required skills expression a number equal to the number of times the agent appears in the set of states X.

14. The program code of claim 11 wherein the sixth code segment further comprises;

a seventh code segment for computing for each agent remaining in contention after the disqualifying step a number AP equal to the number of times the agent appears in the set of states X, an eighth code segment for grouping the agents remaining in contention according to their values of AP, a ninth code segment for processing the groups in the order of lowest value of AP to greatest value of AP until an agent is selected, a tenth code segment for searching for each group processed a proficiency table containing proficiency levels for all skills possessed by the agents remaining in contention, an eleventh code segment for eliminating from contention agents in the present group that do not possess the minimum proficiency level for each skill in the skills expression, a twelfth code segment for calculating a normalized proficiency level for all remaining agents in the present group, a thirteenth code segment for selecting the agent with the smallest normalized proficiency level if there are any agents remaining in contention in the present group, and a fourteenth code segment for processing the next group, if any, if there are no remaining agents in the present group.

15. The program code of claim 14 wherein the twelfth code segment further comprises;

a fifteenth code segment for summing an agent's proficiency levels for each of the skills in a qualifying skill state and subtracting from that value the sum of the required proficiencies for the same skills.

16. Program code embodied in a carrier wave for controlling a computer to assign tasks to agents in a service center based on agent skills required to service individual tasks, the program code comprising;

a first code segment responsive to a task to be serviced for ascertaining all agent skills required to process the task out of a set of N defined skills, a second code segment for representing the N skills as N separate boolean variables, a third code segment for determining a set X of all logical states of the boolean variables that contain the required skills, a fourth code segment for determining from an agent resume table all agents qualified to service the task, wherein the agent resume table is organized by the logical states of the N boolean variables and each agent is represented in each state that includes all skills possessed by the agent, a fifth code segment for disqualifying from serving the task all agents associated with a state of the agent resume table that is not within the set X, a sixth code segment for selecting an agent to service the task from the agents remaining in contention.

17. The program code of claim 16 wherein the sixth code segment further comprises;

a seventh code segment for selecting an agent with a minimum qualification level from among the agents remaining in contention.

18. The program code of claim 17 wherein the seventh code segment further comprises an eighth code segment for subtracting from the number of terms in a canonical form of the required skills expression a number equal to the number of times the agent appears in the set of states X.

19. The program code of claim 16 wherein the sixth code segment further comprises;

a seventh code segment for computing for each agent remaining in contention after the disqualifying step a number AP equal to the number of times the agent appears in the set of states X, an eighth code segment for grouping the agents remaining in contention according to their values of AP, a ninth code segment for processing the groups in the order of lowest value of AP to greatest value of AP until an agent is selected, a tenth code segment for searching for each group processed a proficiency table containing proficiency levels for all skills possessed by the agents remaining in contention, an eleventh code segment for eliminating from contention agents in the present group that do not possess the minimum proficiency level for each skill in the skills expression, a twelfth code segment for calculating a normalized proficiency level for all remaining agents in the present group, a thirteenth code segment for selecting the agent with the smallest normalized proficiency level if there are any agents remaining in contention in the present group, and a fourteenth code segment for processing the next group, if any, if there are no remaining agents in the present group.

20. The program code of claim 19 wherein the twelfth code segment further comprises;

a fifteenth code segment for summing an agent's proficiency levels for each of the skills in a qualifying skill state and subtracting from that value the sum of the required proficiencies for the same skills.

* * * * *